United States Patent
Watanabe et al.

(10) Patent No.: US 11,590,802 B2
(45) Date of Patent: Feb. 28, 2023

(54) PNEUMATIC TIRE

(71) Applicant: Sumitomo Rubber Industries, Ltd., Kobe (JP)

(72) Inventors: Yuma Watanabe, Kobe (JP); Yasuaki Kuniyasu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 99 days.

(21) Appl. No.: 16/926,999

(22) Filed: Jul. 13, 2020

(65) Prior Publication Data

US 2021/0061013 A1 Mar. 4, 2021

(30) Foreign Application Priority Data

Aug. 29, 2019 (JP) .............................. JP2019-157040

(51) Int. Cl.
*B60C 15/06* (2006.01)
*B60C 9/08* (2006.01)
*B60C 9/02* (2006.01)

(52) U.S. Cl.
CPC ............ *B60C 9/08* (2013.01); *B60C 15/0603* (2013.01); *B60C 15/0607* (2013.01);
(Continued)

(58) Field of Classification Search
CPC ...... B60C 2009/0215; B60C 2013/045; B60C 2015/0639; B60C 2015/0646; B60C 2015/065; B60C 2015/061; B60C 2015/0617; B60C 2015/0621; B60C 15/061; B60C 15/0617; B60C 15/0621;
(Continued)

(56) References Cited

U.S. PATENT DOCUMENTS 4,282,918 A * 8/1981 Tomoda ................. B60C 9/0292
152/454
6,318,431 B1 * 11/2001 Ueyoko .................. B60C 15/00
152/543
(Continued)

FOREIGN PATENT DOCUMENTS

EP 1083064 A2 3/2001
EP 3127717 A1 2/2017
(Continued)

OTHER PUBLICATIONS

Machine Translation: JP-05058119-A, Naoi, Toshikatsu (Year: 2021).*
(Continued)

*Primary Examiner* — Kendra Ly
(74) *Attorney, Agent, or Firm* — Birch, Stewart, Kolasch & Birch, LLP

(57) ABSTRACT

A pneumatic tire comprises: a bead portion provided with an inside bead apex rubber disposed between a turned up portion and a main portion of a carcass ply, and an outside bead apex rubber disposed axially outside the turned up portion and having a radially outer edge; and a the sidewall portion provided with a sidewall reinforcing cord layer disposed axially outside the carcass and having a radially inner edge which is spaced apart from the radially outer edge of the outside bead apex rubber by a radial distance of not less than 5% of a tire section height.

11 Claims, 3 Drawing Sheets

(52) U.S. Cl.
CPC .. *B60C 15/0653* (2013.01); *B60C 2009/0215* (2013.01); *B60C 2015/0621* (2013.01)

(58) Field of Classification Search
CPC ............ B60C 15/0603; B60C 15/0607; B60C 2015/0682; B60C 15/0036; B60C 2009/0269; B60C 2009/0276; B60C 2009/0284
See application file for complete search history.

(56) References Cited

U.S. PATENT DOCUMENTS

| | | | | |
|---|---|---|---|---|
| 2005/0006018 | A1* | 1/2005 | Maruoka | B60C 15/06 152/454 |
| 2010/0224300 | A1* | 9/2010 | Maruoka | B60C 15/0607 152/541 |
| 2014/0206809 | A1* | 7/2014 | Miyazaki | B60C 1/0041 524/432 |
| 2017/0274710 | A1* | 9/2017 | Matsumoto | B60C 15/06 |
| 2017/0297376 | A1* | 10/2017 | Ito | B60C 9/0007 |

FOREIGN PATENT DOCUMENTS

| | | | |
|---|---|---|---|
| EP | 3412719 | A1 | 12/2018 |
| JP | 62-4615 | A | 1/1987 |
| JP | 02234812 | A * | 9/1990 |
| JP | 4-163215 | A | 6/1992 |
| JP | 04163215 | A * | 6/1992 |
| JP | 4-278810 | A | 10/1992 |
| JP | 05058119 | A * | 3/1993 |
| JP | 10-53010 | A | 2/1998 |
| JP | 2014125198 | A * | 7/2014 |
| JP | 2015-174511 | A | 10/2015 |
| JP | 2017210116 | A * | 11/2017 |

OTHER PUBLICATIONS

Machine Translation: JP-02234812-A, Kono, Yoshihide (Year: 2021).*
Machine Translation: JP-04163215-A, Ishiguro Y, (Year: 2022).*
Machine Translation: JP-2014125198-A, Hiraoka N, (Year: 2022).*
Machine Translation: JP-2017210116-A, Ogiso T, (Year: 2022).*
Extended European Search Report, dated Nov. 27, 2020. for European Application No. 20186109.3.

* cited by examiner

PNEUMATIC TIRE

TECHNICAL FIELD

The present invention relates to a pneumatic tire, more particularly to a sidewall reinforcing structure.

BACKGROUND ART

The following Patent Document 1 discloses a pneumatic tire comprising: a carcass ply having a main portion extending between bead portions of the tire and a turned up portion turned around a bead core in each of the bead portions; a tread reinforcing belt disposed radially outside the carcass ply in the tread portion of the tire; an bead apex rubber disposed between the carcass ply main portion and turned up portion in each of the bead portions; and a reinforcing layer disposed on the axially outside of the carcass ply main portion in each sidewall portion of the tire, and the reinforcing layer has a radially outer edge secured between the tread reinforcing belt and the carcass ply main portion in the tread portion, and a radially inner edge secured between the carcass ply main portion and the bead apex in the bead portion.

SUMMARY OF THE INVENTION

Problems to be Solved by the Invention

The pneumatic tire of Patent Document 1 has room for improvement in durability during long-distance travel (hereinafter, simply referred to as the "durability performance").

It is therefore, a primary objective of the present invention to provide a pneumatic tire of which durability performance is improved.

According to the present invention, a pneumatic tire comprises:
a tread portion,
a pair of axially spaced bead portions,
a pair of sidewall portions extending between the bead portions and the tread portion, and
a toroidal carcass composed of a carcass ply which extends between the bead portions through the tread portion and the sidewall portions and is turned up in each of the bead portions so as to form a pair of turned up portions and a main portion therebetween,
wherein, in each of the bead portions,
an inside bead apex rubber is disposed between the main portion and the turned up portion of the carcass ply, and
an outside bead apex rubber is disposed axially outside the turned up portion and extends in the tire radial direction to have a radially outer edge, and
in each of the sidewall portions, a sidewall reinforcing cord layer is disposed axially outside the carcass and extends in the tire radial direction to have a radially inner edge, wherein the above-said radially inner edge of the sidewall reinforcing cord layer is spaced radially outwardly apart from the above-said radially outer edge of the outside bead apex rubber by a radial distance of not less than 5% of a tire section height.

Therefore, in the pneumatic tire according to the present invention, the turned up portion of the carcass ply is secured between the inside bead apex rubber and the outside bead apex rubber. As a result, cord breakage, cord loosening and the like can be suppressed, and the durability performance can be improved. Further, the sidewall reinforcing cord layer improves the rigidity of the sidewall portion and also prevents the carcass from being damaged by the cut.

Further, in the present invention, as the radially inner edge of the sidewall reinforcing cord layer is spaced apart from the radially outer edge of the outside bead apex rubber by the specific distance, it is possible to prevent a lowering of the durability performance which is likely caused by separation between the sidewall reinforcing cord layer and the outside bead apex rubber when their edges are overlapped or disposed very closely to each other. Thus, it is possible to prevent a decrease in the rigidity due to such separation. Therefore, the pneumatic tire according to the present invention is effectively improved in the durability performance.

It is preferable that the above-said sidewall reinforcing cord layer has a radially outer edge positioned radially outside the midpoint in the tire radial direction between a maximum tire cross-section width position and an axially outer edge of a tread reinforcing belt disposed radially outside the carcass in the tread portion.

It is preferable that the distance in the tire radial direction between the above-said axially outer edge of the belt and the above-said radially outer edge of the sidewall reinforcing cord layer is not less than 5% but not more than 35% of the tire cross-sectional height.

It is preferable that the dimension in the tire radial direction of the sidewall reinforcing cord layer is not less than 20% but not more than 60% of the tire cross-sectional height.

It is preferable that the sidewall reinforcing cord layer is composed of reinforcing cords laid at an angle in a range from 70 to 90 degrees with respect to the tire circumferential direction.

It is preferable that the thickness of the sidewall reinforcing cord layer is in a range from 1% to 5% of the tire cross-sectional height.

It is preferable that the radially inner edge of the sidewall reinforcing cord layer is positioned radially inside the radially outer edge of the turned up portion of the carcass ply.

It is preferable that the radially inner edge of the sidewall reinforcing cord layer is positioned radially inside the maximum tire cross-section width position.

DESCRIPTION OF THE PREFERRED EMBODIMENTS

The present invention can be applied to pneumatic tires for passenger cars, light trucks, heavy duty vehicles (such as busses and trucks) and the like, and suitably applied to a pneumatic tires for light trucks such as pickup trucks and sport-utility vehicles for on-road driving as well as off-road driving.

Taking a pneumatic tire for light trucks as an example, an embodiment of the present invention will now be described in detail in conjunction with accompanying drawings.

Figure 1:
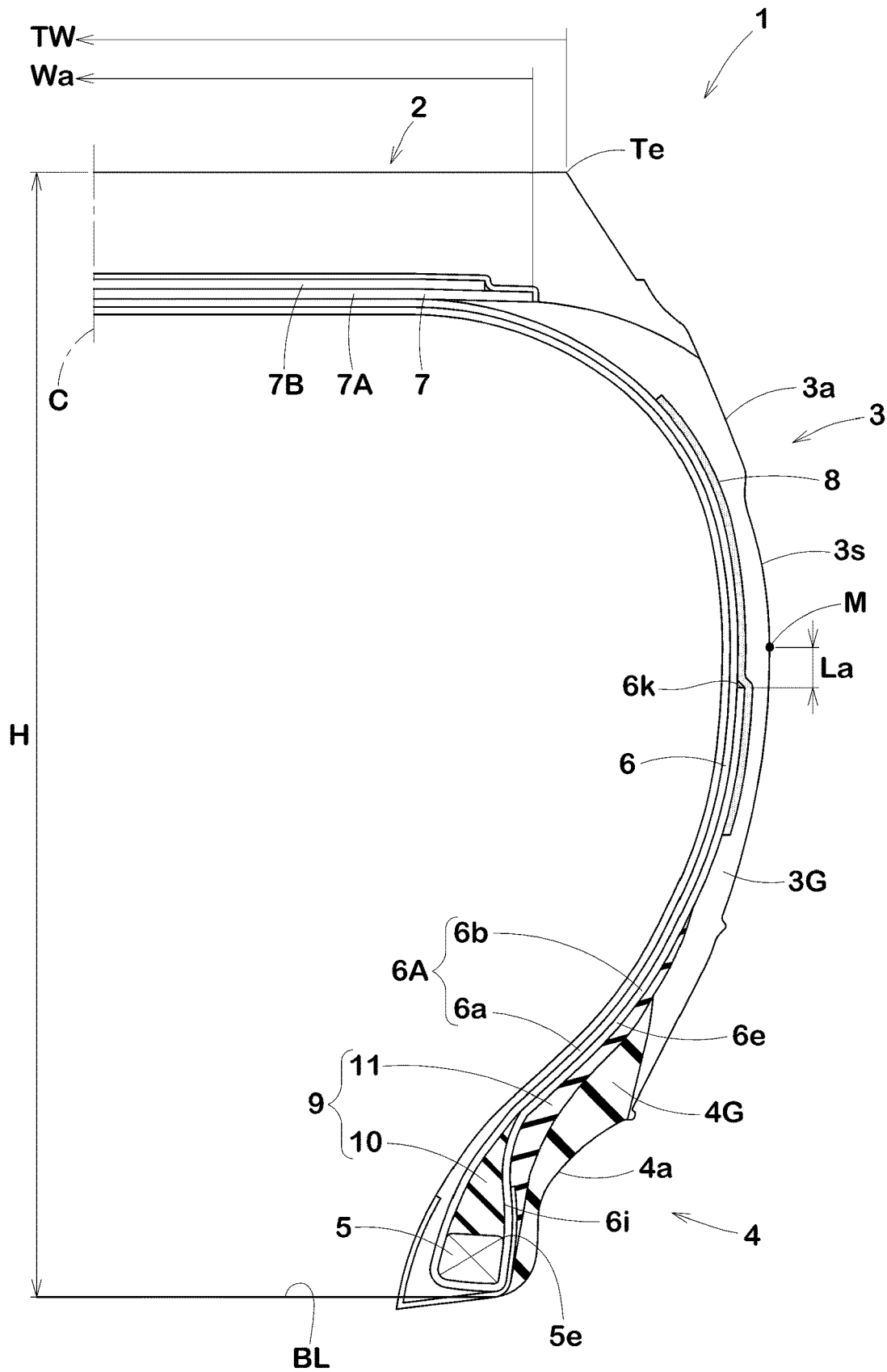
FIG. 1 is a cross sectional partial view of a pneumatic tire as an embodiment of the present invention.

FIG. 1 shows a pneumatic tire 1 for light trucks as an embodiment of the present invention under its normally inflated unloaded condition.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under the normally inflated unloaded condition of the tire unless otherwise noted.

The tread width is the width TW measured under the normally inflated unloaded condition, as the axial distance between the tread edges Te.

The tread edges Te are the axial outermost edges of the ground contacting patch of the tire which occurs under the normally inflated loaded condition when the camber angle of the tire is zero.

The maximum tire cross-section width position is a position M on the outer surface 3s of the sidewall portion 3 (excluding optional protrusions which form decorative serrations, markings, protectors and the like) at which the axial distance between the outer surfaces 3s of the sidewall portions 3 becomes maximum. If the positions M on the outer surfaces 3s are unclear due to the existence of such protrusions, the maximum cross-section width position on the axially outer surface of the carcass in each sidewall portion can be used instead.

The tire cross-section height is the radial distance H from the bead base line BL to the radially outermost position on the tread which usually occurs at the tire equator.

The bead base line BL is, as well known in the tire art, a straight line drawn in parallel with the tire rotational axis, passing through the bead heel points. More specifically, the bead base line passes through a radial position corresponding to the rim diameter of the standard wheel rim.

In the present embodiment, the tire 1 comprises: a tread portion 2 whose outer surface defines the tread face, a pair of axially spaced bead portions 4 each with a bead core 5 embedded therein, and a pair of sidewall portions 3 extending between the tread edges and the bead portions 4.

Further, the tire 1 comprises: a sidewall rubber 3G disposed in each of the sidewall portions 3 to form an axially outer surface 3a of the sidewall portion 3, a clinch rubber 4G disposed in each of the bead portions 4 to form an outer surface 4a of the bead portion 4, and a bead apex rubber 9 disposed in each of the bead portions 4.

The tire 1 is reinforced by cord layers including: a toroidal carcass 6 extending between the bead portions 4 through the tread portion 2 and the sidewall portions 3, a tread reinforcing belt 7 disposed radially outside the carcass 6 in the tread portion 2, and a sidewall reinforcing cord layer 8 disposed in each of the sidewall portions 3.

The carcass 6 may be composed of two or more carcass plies. But, in the present embodiment, the carcass 6 is composed of a single carcass ply 6A.

The carcass ply 6A extends between the bead portions 4 through the tread portion 2 and the sidewall portions 3, and is turned up around the bead core 5 in each of the bead portions 4 from the inside to the outside of the tire so as to form a pair of turned up portions 6b and a main portion 6a therebetween.

In the present embodiment, as shown in FIG. 1, the turned up portion 6b comprises
a radially inner inclined portion 6i extending radially outwardly from the axially outer end 5e of the bead core 5 while inclining to the axially inside, and
a radially outer inclined portion 6e extending radially outwardly from the radially inner inclined portion 6i while inclining to the axially outside.
Such turned up portion 6b can suppress a concentration of strain repeatedly caused during the tire is rolling. In the present invention, however, the turned up portions 6b are not limited to such configuration.

In the present embodiment, the radially outer edges 6k of the turned up portions 6b are positioned near the maximum tire cross-section width position M in order to increase the rigidity of the sidewall portions 3 and improves the durability performance.

It is preferable that the distance La in the tire radial direction between the radially outer edge 6k and the maximum tire cross-section width position M is set in a range of not more than 5% of the tire section height H in order to suppress an excessive increase in the mass of the tire 1.

Figure 2:
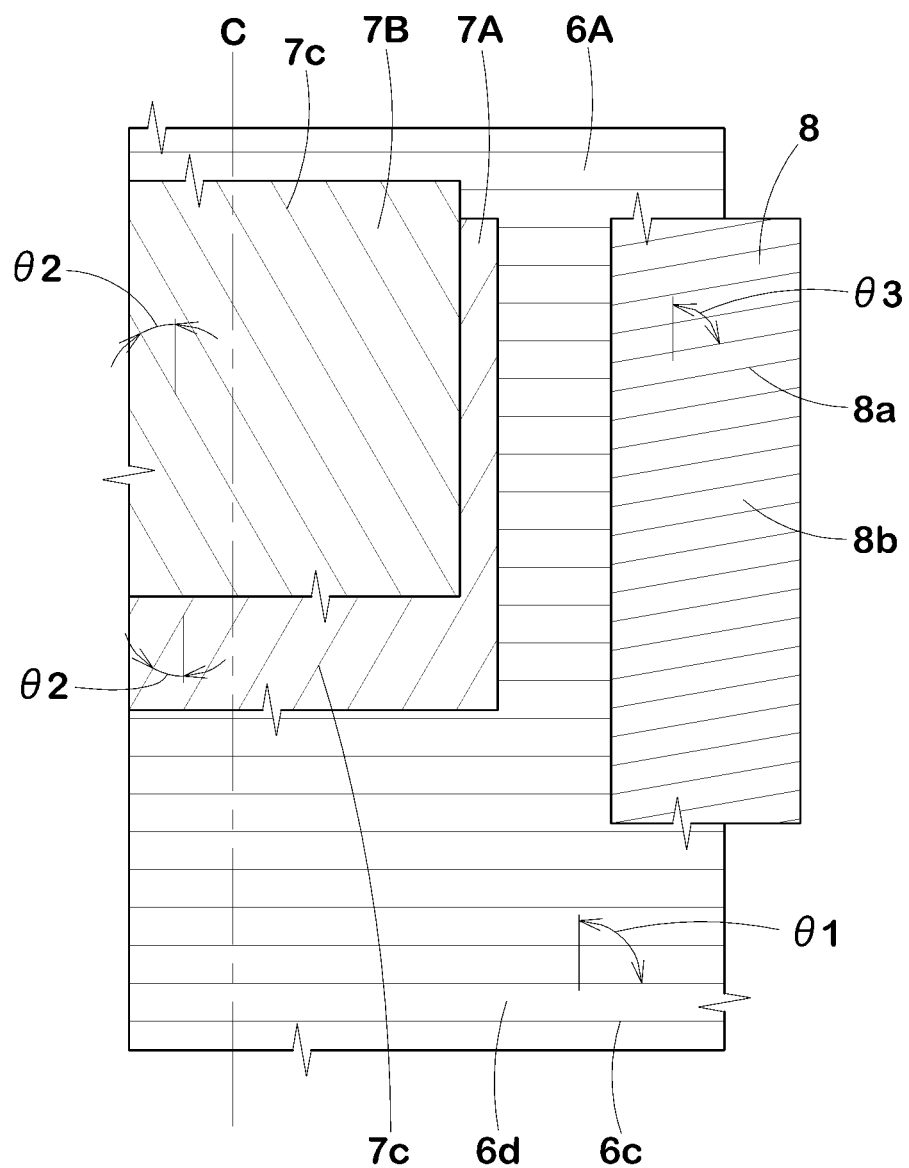
FIG. 2 is a diagram for explaining an arrangement of cord layers disposed in the pneumatic tire shown in FIG. 1.

FIG. 2 diagrammatically shows an arrangement of various reinforcing cords embedded in the tire as the internal structure of the tire.

The carcass ply 6A is composed of carcass cords 6c rubberized by a topping rubber 6d. The carcass cords 6c are arranged radially at an angle θ1 of from 75 to 90 degrees with respect to the tire circumferential direction, for example. As to the carcass cords 6c, metal cords such as steel cords and organic fiber cords such as polyester, nylon, rayon and aramid fiber cords may be used.

The belt 7 is composed of at least one ply of belt cords 7c laid at an angle θ2 of from 10 to 35 degrees with respect to the tire equator C.

In the present embodiment, the belt 7 is composed of two cross plies: a radially inner ply 7A and a radially outer ply 7B thereon. Namely, the belt cords 7c of the radially inner ply 7A cross the belt cords 7c of the radially outer ply 7B. As to the belt cord 7c, steel cords are preferably used. But, high modulus organic fiber cords such as aramid and rayon may be used.

The radially inner ply 7A may be narrower in the axial width than the radially outer ply 7B. But, in the present embodiment, the radially inner ply 7A is wider than the radially outer ply 7B. The axial width wa of the radially inner ply 7A is preferably set in a range from 80% to 95% of the tread width TW.

In the present invention, the bead apex rubber 9 disposed in each bead portion includes: an inside bead apex rubber 10 disposed between the turned up portion 6b and the main portion 6a of the carcass ply, and an outside bead apex rubber 11 disposed axially outside the turned up portion 6b.

Thereby, the turned up portion 6b is secured between the inside bead apex rubber 10 and the outside bead apex rubber 11, so breakage and loosening of the carcass cords can be suppressed, and the durability performance of the tire 1 is improved.

In each of the sidewall portions 3, the sidewall reinforcing cord layer 8 is disposed axially outside the carcass 6 in order to increase the rigidity of the sidewall portion 3 and prevent damage to the carcass 6 by the cut.

Figure 3:
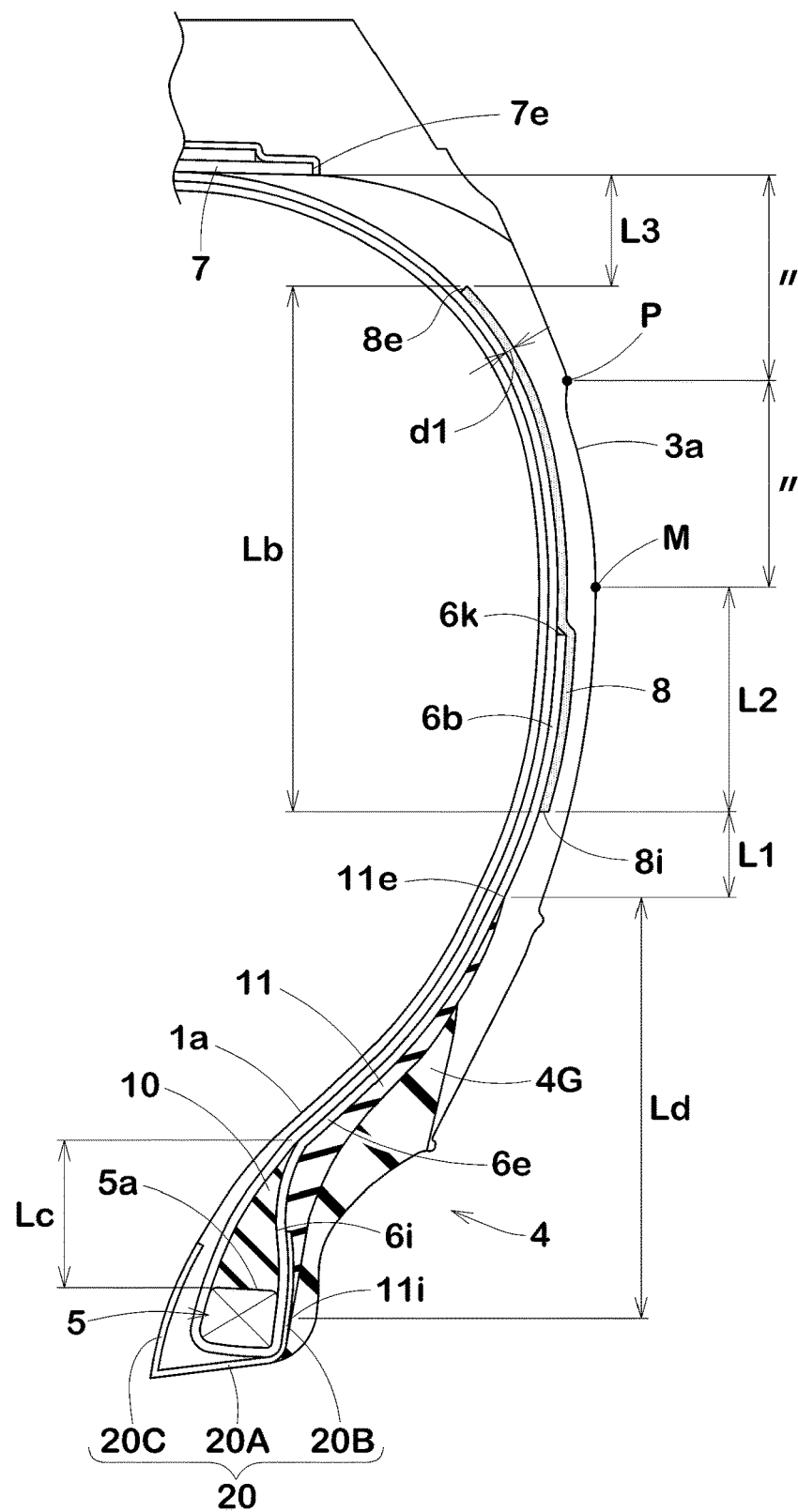
FIG. 3 is a cross sectional partial view of the pneumatic tire shown in FIG. 1.

The sidewall reinforcing cord layer 8 has its radially inner edge 8i which is, as shown in FIG. 3, spaced radially outwardly apart from the radially outer edge 11e of the outside bead apex rubber 11 by a radial distance L1 of not less than 5% of the cross-section height H of the tire in order to prevent separation failure which is likely caused by a direct contact (overlap) or a very close arrangement between the edges 8i and 11e of the sidewall reinforcing cord layer 8 and the outside bead apex rubber 11. This also helps to improve the durability performance of the tire 1.

Preferably, the radial distance L1 between the edges 8i and 11e is set to be not greater than 10% of the tire cross-section height H. If the radial distance L1 is greater, the rigidity of the sidewall portion 3 or the bead portion 4 may be reduced.

on the other hand, the radially inner edge 8i of the sidewall reinforcing cord layer 8 is preferably positioned radially inside the maximum tire cross-section width position M. By disposing the sidewall reinforcing cord layer 8 so as to cover the maximum tire cross-section width position M where the bending deformation during running is relatively large, the deformation of the sidewall rubber 3G is suppressed, and thereby heat generation is reduced. Thus, the durability performance may be further improved.

In order to effectively derive the above-mentioned effects, it is preferred that the radial distance L2 between the radially inner edge 8i of the sidewall reinforcing cord layer 8 and the maximum tire cross-section width position M is set in a range from 10% to 20% of the tire cross-section height H.

Further, in the present embodiment, the radially outer edge 8e of the sidewall reinforcing cord layer 8 is positioned radially outside the midpoint P in the tire radial direction between the axially outer edge 7e of the belt 7 and the maximum tire cross-section width position M. Thereby, damage to the carcass 6 by the cut may be effectively suppressed.

The distance from the carcass 6 to the outer surface 3a of the sidewall portion 3 is increased from the sidewall portion 3 toward the tread portion 2. Thus, the carcass 6 is less likely to be damaged by the cut as it approaches the belt 7. Therefore, in order to suppress the increase in the mass of the tire 1 while securing the cut resistance, the radial distance L3 between the axially outer edge 7e of the belt 7 and the radially outer edge 8e of the sidewall reinforcing cord layer 8 is preferably set in a range of not more than 35%, more preferably not more than 30%, but preferably not less than 5%, more preferably not less than 10% of the tire cross-section height H.

In order to more effectively derive the above-described effects, the radial dimension Lb of the sidewall reinforcing cord layer 8 is preferably set in a range of not less than 20%, more preferably not less than 30%, but preferably not more than 60%, more preferably not more than 50% of the tire cross-sectional height H.

And preferably, the thickness dl of the sidewall reinforcing cord layer 8 is set in a range of not less than 1% but not more than 5% of the tire cross-section height H.

The sidewall reinforcing cord layer 8 is a strip of reinforcing rubber 8b in which reinforcing cords 8a are embedded. The reinforcing cords 8a are arranged in substantially parallel with each other, and the angle θ3 of the reinforcing cords 8a with respect to the tire circumferential direction is preferably set in a range from 70 to 90 degrees in order to effectively increases the rigidity of the sidewall portion 3.

In order to improve the durability performance while suppressing unwanted increase in the mass of the tire 1 and deterioration of the riding comfort performance, it is preferred that the cord count for the reinforcing cords 8a in the sidewall reinforcing cord layer 8 is set in a range from 30 to 80 ends per 50 mm width in the perpendicular direction to the cord longitudinal direction.

As to the reinforcing cords 8a, organic fiber cords, for example, nylon, polyester, rayon and the like, preferably, high modulus fiber cords, for example, aramid, polyethylene naphthalate (PEN), carbon and glass can be used.

As to the reinforcing rubber 8b, rubber compounds having a complex elastic modulus $E^*1$ of from 2 to 8 MPa are preferably used. Such reinforcing rubber 8b can increase the rigidity of the sidewall portion 3 without sacrificing the riding comfort performance.

Here, the complex elastic modulus is measured according to Japanese Industrial standard (JIS) K6394 under the following conditions: amplitude of dynamic strain +/−0.5%, initial strain 10%, frequency 10 Hz and temperature 70 degrees C., using a viscoelastic spectrometer set to a tensile strain mode.

The inside bead apex rubber 10 extends radially outwardly from the radially outer surface 5a of the bead core 5 in a tapered manner as shown in FIG. 3. The inside bead apex rubber 10 in this example has a substantially triangular cross-sectional shape.

The radial dimension Lc of the inside bead apex rubber 10 is preferably set in a range from 5% to 15% of the tire cross-section height H.

The outside bead apex rubber 11 extends along the axially outer surfaces of the radially inner and radially outer inclined portions 6i and 6e of the turned up portion 6b. As a result, the axially inner surface of the outside bead apex rubber 11 is curved convexly toward the axially inside of the tire in an arc shape.

In this example, the axially outer surface of the outside bead apex rubber 11 is also curved convexly toward the axially inside of the tire, but the curve is gentle as compared with that of the axially inner surface.

The thickness of the outside bead apex rubber 11 is gradually increased radially outwardly from its radially inner edge 11i and gradually increased radially inwardly from its radially outer edge 11e.

The outside bead apex rubber 11 can improve the vertical rigidity of the bead portion 4 to suppress the deformation of the bead portion 4, and thereby the durability performance may be improved. Further, as the change in the rigidity of the bead portion 4 in the tire radial direction is smooth, stress concentration is reduced to further improve the durability performance.

In the present embodiment, the radially inner edge 11i of the outside bead apex rubber 11 is located at a position in the vicinity of the bead core 5, in this example, at a position radially inside the radially outer surface 5a of the bead core 5 in order to further suppress the deformation of the bead portion 4.

The radial dimension Ld of the outside bead apex rubber 11 is preferably set in a range of not less than 20% but not more than 40% of the tire cross-section height H.

It is preferable that the complex elastic modulus $E^*2$ of the inside bead apex rubber 10 is larger than the complex elastic modulus $E^*a$ of the clinch rubber 4G, and the complex elastic modulus $E^*2$ is, for example, set in a range of not less than 35 MPa, more preferably not less than 40 MPa, but not more than 70 MPa, more preferably not more than 60 MPa.

It is preferable that the complex elastic modulus $E^*3$ of the outside bead apex rubber 11 is smaller than the complex elastic modulus $E^*2$ of the inside bead apex rubber 10, and the complex elastic modulus $E^*3$ is, for example, set in a range of not less than 30 MPa, but not more than 50 MPa.

It is preferable that the complex elastic modulus $E^*3$ of the outside bead apex rubber 11 is smaller than the complex elastic modulus $E^*a$ of the clinch rubber 4G.

Further, the bead portions 4 are each provided with a chafer rubber 20 for preventing abrasion by the wheel rim. The chafer rubber 20 is a relatively thin layer having a thickness of about 0.5 to 1.5 mm in this example. The chafer rubber 20 is made of a hard rubber having a complex elastic modulus $E^*4$ of from 4 to 10 MPa and having excellent wear and abrasion resistance.

The chafer rubber 20 can be formed from rubber alone, but can be reinforced by embedding a canvas cloth or an organic fiber cord array in the rubber to reinforce it.

The chafer rubber 20 in this example is composed of a base portion 20A, an axially outer portion 20B and an axially inner portion 20C. The base portion 20A extends in the tire axial direction along the bottom surface of the bead portion to contact with the rim seat (not shown) of the wheel rim.

The axially outer portion 20B extends radially outwardly from the axially outer end of the base portion 20A and is sandwiched between the turned up portions 6b and the outside bead apex rubber 11 and terminated therebetween.

The axially inner portion 20C extends radially outwardly from the axially inner end of the base portion 20A along the axially inner surface of the bead portion and is terminated in the bead portion.

while detailed description has been made of a preferable embodiment of the present invention, the present invention can be embodied in various forms without being limited to the illustrated embodiment.

Comparison Tests

Based on the structure shown in FIG. 1, pneumatic tires of size 205/70R15 (rim size 15×6.0 J) were experimentally manufactured as test tires (working example tires Ex.1-Ex.7 and comparative example tire Ref) and tested for the durability performance and cut resistance performance.

Specifications of the test tires are shown in Table 1.
The followings are common to all test tires:
Complex elastic modulus $E^*1$ of reinforcing rubber 8b: 1.4 MPa
Complex elastic modulus $E^*2$ of inside bead apex rubber: 70 MPa
Complex elastic modulus $E^*3$ of outside bead apex rubber: 30 MPa
Position of the radially outer edge 8e of the sidewall reinforcing cord layer 8: radially outside Midpoint P
Position of the radially inner edge 8i of the sidewall reinforcing cord layer 8: radially outside the radially outer edge 11e of the outside bead apex rubber 11

<Durability Performance>

In the Durability performance test, each test tire was mounted on a standard wheel rim of size 15×6.07 and inflated to a standard pressure of 250 kPa. Then, using a tire test drum, the tire was rotated at the peripheral speed of 80 km/h under 200% of its standard load, up to the running distance of 15000 km. If any failure occurred in the sidewall portions, the running distance was recorded as the durability performance.

The test results are shown in Table 1 by an index based on the comparative example tire Ref being 100, wherein the larger the value, the longer the running distance, namely, the better the durability performance.

<Cut Resistance Performance>

The test tire mounted on a wheel rim of size 15×6.0 J and inflated to 250 kPa was installed on all wheels of a test vehicle (light truck) and run on a tire test course including a dry asphalt paved road and a dirt road including gravel road. The average running speed was 80 km/h. After running for a predetermined distance, the test tires were visually inspected, and the resistance of cut was evaluated based on the occurrence of cuts in the sidewall portions.

The test results are shown in Table 1 by a score based on the comparative example tire Ref being 100, wherein the larger the value, the better the cut resistance performance.

TABLE 1

| Tire | Ref | Ex. 1 | Ex. 2 | Ex. 3 | Ex. 4 | Ex. 5 | Ex. 6 | Ex. 7 |
|---|---|---|---|---|---|---|---|---|
| L1/H (%) | 2 | 5 | 8 | 15 | 8 | 8 | 8 | 8 |
| Lb/H (%) | 36 | 40 | 40 | 40 | 15 | 50 | 42 | 40 |
| L3/H (%) | 15 | 8 | 8 | 8 | 8 | 8 | 3 | 5 |
| Durability | 100 | 120 | 120 | 115 | 115 | 115 | 120 | 120 |
| Cut resistance | 100 | 110 | 110 | 110 | 110 | 110 | 112 | 112 |

From the test results, it was confirmed that the working example tires had better durability performance and cut resistance as compared with the comparative example tire, and that the working example tire Ex.1 had a light weight and the manufacturing cost was low as compared with the working example tires Ex.6 and Ex.7.

DESCRIPTION OF THE REFERENCE SIGNS

1 Pneumatic tire
3 Sidewall portion
4 Bead portion
6 Carcass
6a Main portion
6b Turned up portion
8 Sidewall reinforcing cord layer
8i Radially inner edge of sidewall reinforcing cord layer
10 Inside bead apex rubber
11 Outside bead apex rubber
11e Radially outer edge of outside bead apex rubber
H Tire section height

The invention claimed is:

1. A pneumatic tire comprising:
a tread portion,
a pair of axially spaced bead portions,
a pair of sidewall portions extending between the bead portions and the tread portion,
a toroidal carcass composed of a carcass ply which extends between the bead portions through the tread portion and the sidewall portions and is turned up in each of the bead portions so as to form a pair of turned up portions and a main portion therebetween, and a belt disposed radially outside the toroidal carcass in the tread portion, wherein each of the turned up portions extends radially outwardly so that the distance in the tire radial direction between a radially outer edge of the turned up portion and a maximum tire cross-section width position is in a range of not more than 5% of a tire cross-sectional height, wherein in each of the bead portions, an inside bead apex rubber is disposed between the main portion and the turned up portion of the carcass ply, an outside bead apex rubber is disposed axially outside the turned up portion, a clinch rubber is disposed on the axially outside of the outside bead apex rubber so as to form an outer surface of the bead portion, a complex elastic modulus of the inside bead apex rubber is larger than a complex elastic modulus of the clinch rubber which is larger than a complex elastic modulus of the outside bead apex rubber, the outside bead apex rubber extends in the tire radial direction to have a radially outer edge and a radial dimension of not less than 20% but not more than 40% of the tire cross-section height, and the radially outer edge of the outside bead apex rubber is positioned radially outside a radially outer edge of the clinch rubber, in each of the sidewall portions, a sidewall reinforcing cord layer is disposed axially outside the carcass and extends in the tire radial direction to have a radially inner edge and a radially outer edge, and the sidewall reinforcing cord layer is composed of reinforcing cords laid at an angle of from 70 to 90 degrees with respect to the tire circumferential direction, said radially outer edge of the sidewall reinforcing cord layer is positioned radially outside a midpoint in the tire radial direction between the maximum tire cross-section width position and an axially outer edge of the belt, and the distance in the tire radial direction between said radially outer edge of the sidewall reinforcing cord layer and said axially outer edge of the belt is not less than 5% but not more than 35% of the tire cross-sectional height, said radially inner edge of the sidewall reinforcing cord layer is spaced radially outwardly apart from said radially outer edge of the outside bead apex rubber, said radially inner edge of the sidewall reinforcing cord layer is positioned radially inside the radially outer edge of the turned up portion of the carcass ply, and a radially inner edge portion of the sidewall reinforcing cord layer overlaps with a radially outer edge portion of the turned up portion and is disposed axially outside of the turned up portion, a distance in the tire radial direction between said radially inner edge of the sidewall reinforcing cord layer and the maximum tire cross-section width position is not less than 10% but not more than 20% of the tire cross-sectional height, and a distance in the tire radial direction between said radially inner edge of the sidewall reinforcing cord layer and said radially outer edge of the outside bead apex rubber is not less than 5% but not more than 10% of the tire cross-sectional height.

2. The pneumatic tire according to claim 1, wherein said radially inner edge of the sidewall reinforcing cord layer is positioned radially inside the maximum tire cross-section width position.

3. The pneumatic tire according to claim 1, wherein the dimension in the tire radial direction of the sidewall reinforcing cord layer is not less than 20% but not more than 60% of the tire cross-sectional height.

4. The pneumatic tire according to claim 3, wherein said radially inner edge of the sidewall reinforcing cord layer is positioned radially inside the maximum tire cross-section width position.

5. The pneumatic tire according to claim 1, wherein the thickness of the sidewall reinforcing cord layer is in a range from 1% to 5% of the tire cross-sectional height.

6. The pneumatic tire according to claim 5, wherein said radially inner edge of the sidewall reinforcing cord layer is positioned radially inside the maximum tire cross-section width position.

7. A pneumatic tire comprising:

a tread portion, a pair of axially spaced bead portions, a pair of sidewall portions extending between the bead portions and the tread portion, a toroidal carcass composed of a carcass ply which extends between the bead portions through the tread portion and the sidewall portions and is turned up in each of the bead portions so as to form a pair of turned up portions and a main portion therebetween, and a belt disposed radially outside the toroidal carcass in the tread portion, wherein each of the turned up portions extends radially outwardly so that the distance in the tire radial direction between a radially outer edge of the turned up portion and a maximum tire cross-section width position is in a range of not more than 5% of a tire cross-sectional height, wherein in each of the bead portions, an inside bead apex rubber is disposed between the main portion and the turned up portion of the carcass ply, an outside bead apex rubber is disposed axially outside the turned up portion, a clinch rubber is disposed on the axially outside of the outside bead apex rubber so as to form an outer surface of the bead portion, a complex elastic modulus of the inside bead apex rubber is larger than a complex elastic modulus of the clinch rubber which is larger than a complex elastic modulus of the outside bead apex rubber, the outside bead apex rubber extends in the tire radial direction to have a radially outer edge and a radial dimension of not less than 20% but not more than 40% of the tire cross-section height, and the radially outer edge of the outside bead apex rubber is positioned radially outside a radially outer edge of the clinch rubber, in each of the sidewall portions, a sidewall reinforcing cord layer is disposed axially outside the carcass and extends in the tire radial direction to have a radially inner edge and a radially outer edge, and the sidewall reinforcing cord layer is composed of reinforcing cords laid at an angle of from 70 to 90 degrees with respect to the tire circumferential direction, said radially outer edge of the sidewall reinforcing cord layer is positioned radially outside a midpoint in the tire radial direction between the maximum tire cross-section width position and an axially outer edge of the belt, and the distance in the tire radial direction between said radially outer edge of the sidewall reinforcing cord layer and said axially outer edge of the belt is not less than 5% but not more than 35% of the tire cross-sectional height, said radially inner edge of the sidewall reinforcing cord layer is spaced radially outwardly apart from said radially outer edge of the outside bead apex rubber, and said radially inner edge of the sidewall reinforcing cord layer is positioned radially inside the radially outer edge of the turned up portion of the carcass ply, and a radially inner edge portion of the sidewall reinforcing cord layer overlaps with a radially outer edge portion of the turned up portion and is disposed axially outside of the turned up portion, the radial dimension of the inside bead apex rubber is in a range from 5% to 15% of the tire cross-sectional height, the carcass consists of said carcass ply, the turned up portion extends radially outwardly, while contacting with the main portion from the radially outer edge of the inside bead apex rubber to the radially outer edge of the turned up portion, a distance in the tire radial direction between said radially inner edge of the sidewall reinforcing cord layer and the maximum tire cross-section width position is not less than 10% but not more than 20% of the tire cross-sectional height, and a distance in the tire radial direction between said radially inner edge of the sidewall reinforcing cord layer and said radially outer edge of the outside bead apex rubber is not less than 5% but not more than 10% of the tire cross-sectional height.

8. The pneumatic tire according to claim 7, wherein
the radial dimension of the outside bead apex rubber is larger than the radial dimension of the inside bead apex rubber, the complex elastic modulus $E*2$ of the inside bead apex rubber is in a range from 35 MPa to 70 MPa, and the complex elastic modulus $E*3$ of the outside bead apex rubber is in a range from 30 MPa to 50 MPa.

9. The pneumatic tire according to claim 8, wherein the reinforcing cords are embedded in a reinforcing rubber having a complex elastic modulus $E*1$ of from 2 to 8 MPa.

10. The pneumatic tire according to claim 9, wherein the reinforcing cords are organic fiber cords, and the thickness of the sidewall reinforcing cord layer is in a range from 1% to 5% of the tire cross-sectional height.

11. A pneumatic tire comprising:
a tread portion,
a pair of axially spaced bead portions,
a pair of sidewall portions extending between the bead portions and the tread portion,
a toroidal carcass composed of a carcass ply which extends between the bead portions through the tread portion and the sidewall portions and is turned up in each of the bead portions so as to form a pair of turned up portions and a main portion therebetween, and
a belt disposed radially outside the toroidal carcass in the tread portion,
wherein
each of the turned up portions extends radially outwardly so that the distance in the tire radial direction between a radially outer edge of the turned up portion and a maximum tire cross-section width position is in a range of not more than 5% of a tire cross-sectional height, wherein
in each of the bead portions, an inside bead apex rubber is disposed between the main portion and the turned up portion of the carcass ply, an outside bead apex rubber is disposed axially outside the turned up portion, a clinch rubber is disposed on the axially outside of the outside bead apex rubber so as to form an outer surface of the bead portion, a complex elastic modulus of the inside bead apex rubber is larger than a complex elastic modulus of the clinch rubber which is larger than a complex elastic modulus of the outside bead apex rubber, the outside bead apex rubber extends in the tire radial direction to have a radially outer edge and a radial dimension of not less than 20% but not more than 40% of the tire cross-section height, and the radially outer edge of the outside bead apex rubber is positioned radially outside a radially outer edge of the clinch rubber, in each of the sidewall portions, a sidewall reinforcing cord layer is disposed axially outside the carcass and extends in the tire radial direction to have a radially inner edge and a radially outer edge, and the sidewall reinforcing cord layer is composed of reinforcing cords laid at an angle of from 70 to 90 degrees with respect to the tire circumferential direction, said radially outer edge of the sidewall reinforcing cord layer is positioned radially outside a midpoint in the tire radial direction between the maximum tire cross-section width position and an axially outer edge of the belt, and the distance in the tire radial direction between said radially outer edge of the sidewall reinforcing cord layer and said axially outer edge of the belt is not less than 5% but not more than 35% of the tire cross-sectional height, said radially inner edge of the sidewall reinforcing cord layer is spaced radially outwardly apart from said radially outer edge of the outside bead apex rubber, and said radially inner edge of the sidewall reinforcing cord layer is positioned radially inside the radially outer edge of the turned up portion of the carcass ply, and a radially inner edge portion of the sidewall reinforcing cord layer overlaps with a radially outer edge portion of the turned up portion and is disposed axially outside of the turned up portion, the radial dimension of the inside bead apex rubber is in a range from 5% to 15% of the tire cross-sectional height, a distance in the tire radial direction between said radially inner edge of the sidewall reinforcing cord layer and the maximum tire cross-section width position is not less than 10% but not more than 20% of the tire cross-sectional height, and a distance in the tire radial direction between said radially inner edge of the sidewall reinforcing cord layer and said radially outer edge of the outside bead apex rubber is not less than 5% but not more than 10% of the tire cross-sectional height.

* * * * *